(12) United States Patent
Azancot et al.

(10) Patent No.: US 9,161,385 B2
(45) Date of Patent: Oct. 13, 2015

(54) SYSTEMS AND METHODS FOR WIRELESS COMMUNICATIONS IN A SOLAR FIELD

(71) Applicant: BRIGHTSOURCE INDUSTRIES (ISRAEL) LTD., Jerusalem (IL)

(72) Inventors: Yossi Azancot, Jerusalem (IL); Lev Razamat, Rishon Letziyyon (IL)

(73) Assignee: BRIGHTSOURCE INDUSTRIES (ISRAEL) LTD., Jerusalem (IL)

( * ) Notice: Subject to any disclaimer, the term of this patent is extended or adjusted under 35 U.S.C. 154(b) by 135 days.

(21) Appl. No.: 14/088,529

(22) Filed: Nov. 25, 2013

(65) Prior Publication Data

US 2014/0146741 A1 May 29, 2014

Related U.S. Application Data

(60) Provisional application No. 61/729,701, filed on Nov. 26, 2012.

(51) Int. Cl.
| | |
|---|---|
| *H04B 7/00* | (2006.01) |
| *H04B 7/185* | (2006.01) |
| *H04W 4/00* | (2009.01) |
| *H04W 84/12* | (2009.01) |
| *H04W 16/18* | (2009.01) |

(52) U.S. Cl.
CPC .............. *H04W 84/12* (2013.01); *H04W 16/18* (2013.01)

(58) Field of Classification Search
CPC ......... Y02E 10/40; Y02E 40/00; Y02E 40/72; Y04S 10/30; Y04S 10/40123; Y04S 20/34; Y04S 20/40; Y04S 20/52; Y04S 20/322; Y04S 20/525; Y04S 40/122; Y04S 1/24; Y04S 1/126; Y02B 70/343; Y02B 70/3208; Y02B 90/242; Y02B 90/248; Y02B 90/2623; Y02B 90/2638; Y02B 90/2653; F24J 2/40; F24J 2002/0084; F24J 2200/04; C10J 2300/123; C10J 2300/1292; G02B 19/0042; G01R 22/063; H04W 16/18; H04W 84/12; H02G 1/00; H02J 3/383; H02J 3/385; H02J 7/0052; H02J 7/35; H02J 13/0024; H02J 13/0062; H02J 13/0075
USPC .................................................. 370/310–350
See application file for complete search history.

(56) References Cited

U.S. PATENT DOCUMENTS

| | | |
|---|---|---|
| 2004/0054774 A1 | 3/2004 | Barber et al. |
| 2008/0084858 A1 | 4/2008 | Hart et al. |
| 2009/0137221 A1 | 5/2009 | Nanda et al. |

(Continued)

OTHER PUBLICATIONS

International Search Report and Written Opinion for International Application No. PCT/IB13/60389, mailed May 12, 2014.

*Primary Examiner* — Tri H Phan
(74) *Attorney, Agent, or Firm* — Miles & Stockbridge P.C.; Mark A. Catan

(57) ABSTRACT

Embodiments relate to methods and systems of controlling and operating a wirelessly controlled solar field. By placing a higher density of access points in regions close to the solar field border, communication interference may be mitigated. A method of mitigating interference between an access point and a heliostat in a wireless communication system located in a solar field, may include in a first section of the solar field, deploying a first plurality of access points such that each of the access points is a first distance from its neighbor; and in a second section of the solar field, deploying a second plurality of access points such that each of the access points is a second distance from its neighbor. The first distance is greater than the second distance and the second section of the solar field may be closer to a perimeter of the solar field.

27 Claims, 10 Drawing Sheets

(56) References Cited

U.S. PATENT DOCUMENTS

| | | | |
|---|---|---|---|
| 2010/0139644 A1* | 6/2010 | Schwarzbach et al. | 126/573 |
| 2010/0191378 A1* | 7/2010 | Gilon et al. | 700/275 |
| 2011/0044193 A1 | 2/2011 | Forenza et al. | |
| 2013/0048752 A1* | 2/2013 | Gilon et al. | 239/165 |
| 2013/0087139 A1* | 4/2013 | Kroyzer et al. | 126/714 |
| 2013/0092156 A1* | 4/2013 | Quero Garcia et al. | 126/714 |

* cited by examiner

SYSTEMS AND METHODS FOR WIRELESS COMMUNICATIONS IN A SOLAR FIELD

CROSS-REFERENCE TO RELATED APPLICATIONS

The present application claims the benefit of U.S. Provisional Application No. 61/729,701, filed Nov. 26, 2012, which is hereby incorporated by reference herein in its entirety.

FIELD

The present disclosure relates generally to solar steam systems, and, more particularly, to methods and systems for operating and controlling a wirelessly controlled solar field.

SUMMARY

A solar energy system may include a solar field comprising multiple heliostats. Each heliostat may be controlled by a wireless heliostat controller. In a solar energy system the number of heliostats may range from several hundred to several hundreds of thousands, or more, and may be distributed in an area with a radius of, for example, approximately 1 to 5 kilometers.

Some embodiments may include a method of operating a wireless data system in a solar field with a central receiver. The wireless data system may include plurality of access points and a plurality of heliostats, where the heliostats are wireless clients with respective transceivers. The method may include receiving at one or both of each access point and each heliostat, respective communication codes that permit communication between each access points and only a respective assigned group of heliostats, the respective assigned group of heliostats falling within a range of distances respective to each of the access points. The solar field may have a perimeter such that first ones of the access points are closer to the perimeter than second ones of the access points. The receiving being such that a maximum distance of the respective range of the first ones of the access points may be smaller in magnitude than a maximum distance of the respective range of the second ones of the access points. The access points that are more remote from the perimeter are enabled to communicate with heliostats that are further from them than access points closer to the perimeter. The heliostats associated with the first ones of the access points may be vulnerable to an interference signal originating from outside the solar field. The cell size of the first ones of access points may be smaller than that of the second ones. The deployment of the first ones of access points may be optimized responsively to one or more interference signals. As such, the first ones of access points may operate at a higher power level, on average, than the second ones of access points. In some embodiments, at least some of the heliostats located near the perimeter exchange data communication via a wired communication system. Heliostats remote from the perimeter act as repeaters for heliostats located nearer the perimeter, or alternatively, a first plurality of heliostats located near the perimeter act as repeaters for a second plurality of heliostats located near the perimeter. In case an interference signal is detected by an access point a command signal may be generated so a corrective action may be taken. Heliostats and access points remote from the perimeter may be located at a radial distance from a solar tower that is equivalent to between 10 percent and 90 percent of a maximum radial dimension of the field. The average density of the first ones of access points may be, for example, at least 10% or 20% or 30% greater than the average density of the second ones of access points. The first ones and second ones of access points may be configured to communicate according to first and second communication protocols with their respective assigned heliostats, respectively, and the second communication protocol may have a higher signal noise mitigation characteristic, according to a predetermined type of interference, than the first protocol. The second protocol may employ space-time block coding.

Some embodiments may include a solar tower system comprising a solar tower having a target therein and a field of heliostats surrounding the solar tower. Each heliostat may be configured to direct insolation at a target on the solar tower. Each heliostat may be configured to receive communications over at least one wireless network. The solar field may include an inner region and an outer region, wherein both the inner and outer regions substantially surround the solar tower, the outer region surrounding the inner region. The system may also comprise a plurality of access points configured to communicate over the wireless network to permit each of the heliostats to communicate therewith. The access point density in the outer region may be higher than the access point density in the inner region and the outer region is more susceptible to wireless communication interference. The access points in the outer region may be positioned responsively to a measured and/or predicted interference signal. The deployment of the access points may be optimized responsively to one or more predetermined interference signals.

Some embodiments may relate to a method of mitigating interference between an access point and a heliostat in a wireless communication system located in a solar field. The solar field may include a receiver and a solar tower, heliostats surrounding the solar tower, and a plurality of access points, each heliostat being configured to wirelessly communicate with at least one access point. The method may include deploying a first plurality of access points such that each of the access points is a first distance from its neighbor in a first section of the solar field, and deploying a second plurality of access points such that each of the access points is a second distance from its neighbor in a second section of the solar field. The first distance may be greater than the second distance and the second section of the solar field is adjacent to perimeter of the solar field.

The second section of the solar field may surround the first section of the solar field, such that the distance between the outer border of the solar field and the first section is, for example, at least 100 meters or at least 1 kilometer. In the embodiment, the interference originates from outside the solar field. The access points in the first section of the solar field may for example have a coverage area radius of between 100 meters and 200 meters and the access points in the second section of the solar field may for example have a coverage area radius of between 10 meters and 100 meters. The first distance between neighboring access points, for example, is between approximately 100 meters and approximately 200 meters and the second distance between neighboring access points is between approximately 10 meters and approximately 100 meters. In some examples, the signal power of the access points in the second section of the solar field may be increased. The method of mitigating signal interference may include space-time block coding in the second section of the solar field. Alternatively or additionally, space diversity between the antenna on each of the heliostats in the second section of the solar field may be used to mitigate interference.

Some embodiments may include a method of operating a wireless data system in a solar field with a central receiver. The wireless data system may include plurality of access points and a plurality of heliostats, where the heliostats are wireless clients with respective transceivers. The method may include, receiving communication signals at each of the access points from a proximate subset of the heliostats within a respective physical distance of the each of the access points permitted by the range of the each of the access points. Each of the access points may decode signals received from the subset of the heliostats assigned to each of the access points. The assignment of heliostats to an access point can be predetermined. The assignment can be stored permanently in a database, it can be stored temporarily in a database, and/or it can be received in an instruction through the wireless data system. The assignment can change from time to time or remain unchanged for days, months or years. A database of assignments can be stored in magnetic, optical or solid state storage media at the access point or at another location accessible to the access point through a data communications network. The access points may detect but not decode other heliostats from the subset, thereby filtering out unassigned heliostats of the subset. The solar field may have a perimeter such that first ones of the access points are closer to the perimeter than second ones of the access points. The heliostats assigned to each of the first ones may be restricted to a smaller distance of the each of the first ones than the heliostats assigned to the each of the second ones. The heliostats associated with the first ones of the access points may be vulnerable to an interference signal originating from outside the solar field. The deployment of the first ones of access points may be optimized responsively to one or more interference signals. The first ones of access points may be positioned responsively to a measured and/or predicted interference signal. The concentration of first ones of access points per unit land area may be greater than the concentration of second ones of access points.

Objects and advantages of embodiments of the present disclosure will become apparent from the following description when considered in conjunction with the accompanying drawings.

BRIEF DESCRIPTION OF THE DRAWINGS

Embodiments will hereinafter be described with reference to the accompanying drawings, which have not necessarily been drawn to scale. Where applicable, some features may not be illustrated to assist in the illustration and description of underlying features. Throughout the figures, like reference numerals denote like elements.

DETAILED DESCRIPTION

In the following detailed description, numerous specific details are set forth in order to provide a thorough understanding of the disclosed subject matter. However, it will be understood by those of ordinary skill in the art that the present invention may be practiced without these specific details. In other instances, well-known methods, procedures and components may not have been described in detail so as not to obscure aspects of the disclosed subject matter.

Embodiments of the present disclosure relate generally to solar energy systems that include at least one solar field, e.g., one or more apparatus for redirecting insolation toward a solar target. Solar targets can be configured to convert insolation into another form of energy, e.g., electricity (for example, by using photovoltaic cells), thermal energy (for example, by using sun solar thermal systems), or biofuels. The one or more solar fields may have different footprints or geometries. For example, a plurality of heliostat-mounted mirrors (referred to herein as heliostats) can track the sun to reflect incident sunlight onto a solar target, for example, at or near the top of a solar tower.

Generally, a central receiver system, such as one with a receiver supported on a tower, can include at least one solar receiver and a plurality of heliostats. Each heliostat can track the sun so as to reflect light to a target on a tower or an aiming point on such a target. The heliostats can be arrayed in any suitable manner. For example, heliostat spacing and positioning can be selected to provide optimal financial return over a life cycle according to predictive weather data and at least one optimization goal such as total solar energy utilization, energy storage, electricity production, or revenue generation from sales of electricity.

The solar receiver can receive reflected and optionally concentrated solar radiation and convert the reflected solar radiation to some useful form of energy, such as heat or electricity. The receiver can be located at the top of the receiver tower. Solar receivers may be configured to heat a fluid such as water and/or steam and/or supercritical steam and/or molten salts and/or molten metals using insolation received from the heliostats. In different examples, the solar receiver may be at least 25 m, at least 50 m, at least 75 m or at least 100 m or at least 125 m or at least 200 m or even higher.

Figure 1A:
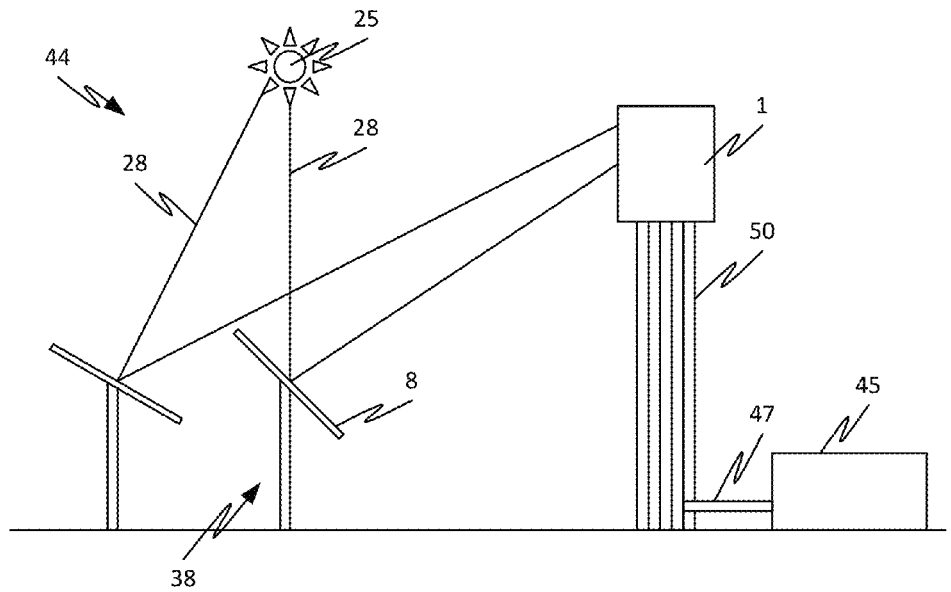
FIGS. 1A and 1B are diagrammatic elevation views of a plurality of heliostats and a central power tower, according to one or more embodiments of the disclosed subject matter.
Figure 1B:
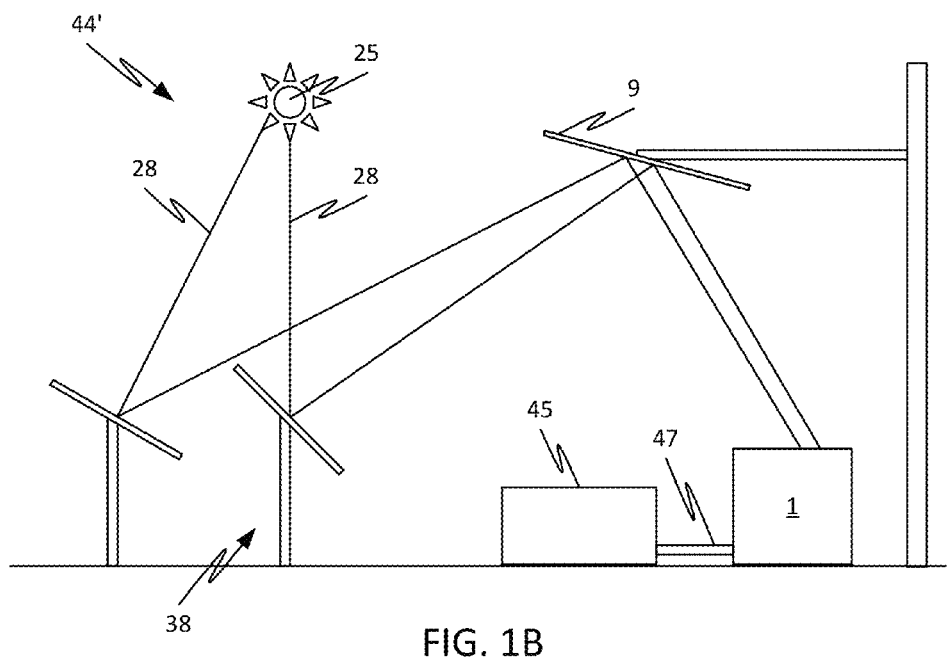

Referring to the figures and, in particular, to FIG. 1A, a solar power system 44 is shown. Heliostats 38 include mirrors 8 that reflect incident solar radiation 28 onto a receiver 1 in which a working fluid (not shown) is heated for later use in an electric power generating plant 45. The heliostats 38 are capable of tracking the apparent movement of the sun 25 across the sky each day in order to maintain the reflective focus in the direction of the receiver 1 as the angle of the incident radiation 28 changes. The receiver 1 is located atop a tower 50. In an alternative embodiment of a solar power system 44', as shown in FIG. 1B, the solar receiver is located on the ground, and the heliostats 38 reflect solar radiation onto one or more suspended mirrors 9 which further reflect the radiation onto receiver 1.

A fluid (not shown) can be heated in receiver 1 and conveyed via a pipe 47 or other conveyance device (e.g., truck, train, pipeline, etc.) for contemporaneous or later use, for example, to generate power in an electric power generating plant 45. The heated fluid can also be stored in a minimal heat loss storage unit (not shown) for later use by the electric power generating plant 45, for example, when solar insolation levels are below a minimal value. A thermal storage that includes the heat transfer fluid and/or another thermal mass or phase change material may be included in the fluid conveyance. The heat in the fluid can be used in the generation of electricity by, for example, a turbine employing a Rankine, organic Rankine, or Brayton cycle. The fluid may be a working fluid or intermediate heat transfer fluid (e.g., molten salt) used to heat a working fluid. For example, the fluid in the receiver may be water, steam, a mixture of water and steam, or a molten salt, such as a nitrate salt (e.g., a combination of liquid sodium nitrate and potassium nitrate).

Manually or by using a computerized control system, the solar heat flux reflected onto the exterior surfaces of the receiver can be balanced and/or optimized by selecting and aiming heliostats from the solar fields. Optimally, the balancing and optimizing of solar heat flux with respect to a superheating receiver can be assigned higher priority in the system's operating procedures or control programming than the balancing and optimizing of solar heat flux with respect to other receivers in the system.

Figure 2:
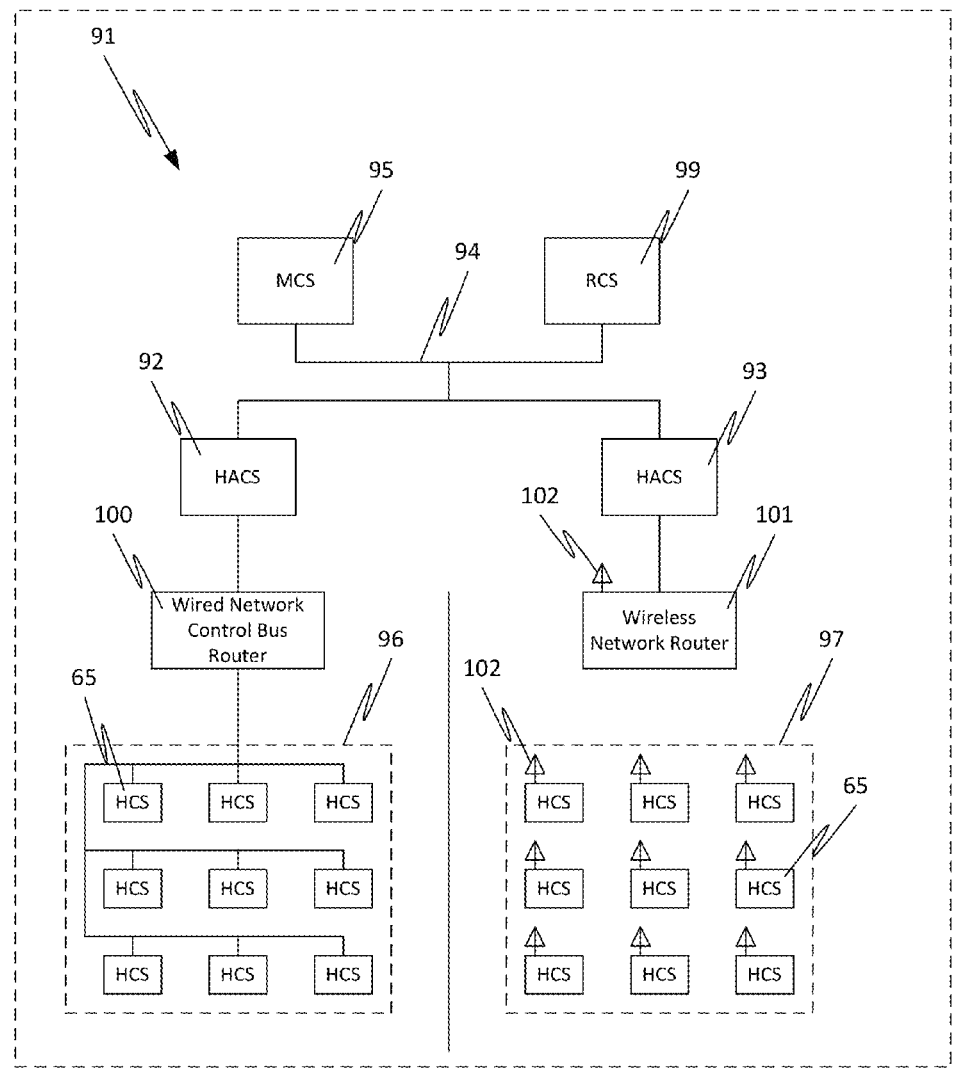
FIG. 2 is an illustration of a hierarchical central heliostat control system, according to one or more embodiments of the disclosed subject matter.

Heliostats can be controlled through a central heliostat field control system 91, for example, as shown in FIG. 2. For example, a central heliostat field control system 91 can communicate hierarchically through a data communications network with controllers of individual heliostats. Additionally or alternatively, the heliostat field can be controlled by any combination or variation on centralized control and distributed control, for example, by using a control system that communicates hierarchically through a data communications network with individual or final controllers for each heliostat.

FIG. 2 illustrates a hierarchical control system 91 that includes three levels of control hierarchy, although in other implementations there can be more or fewer levels of hierarchy, and in still other implementations the entire data communications network can be without hierarchy, for example, in a distributed processing arrangement using a peer-to-peer communications protocol. At a lowest level of control hierarchy (i.e., the level provided by heliostat controller) in the illustration there are provided programmable heliostat control systems (HCS) 65, which control the two-axis (azimuth and elevation) movements of heliostats (not shown), for example, as they track the movement of the sun. At a higher level of control hierarchy, heliostat array control systems (HACS) 92, 93 are provided, each of which controls the operation of heliostats (not shown) in heliostat fields 96, 97, by communicating with programmable heliostat control systems 65 associated with those heliostats through a multipoint data network 94 employing a network operating system such as CAN, Devicenet, Ethernet, or the like. At a still higher level of control hierarchy a master control system (MCS) 95 is provided which indirectly controls the operation of heliostats in heliostat fields 96, 97 by communicating with heliostat array control systems 92, 93 through network 94. Master control system 95 further controls the operation of a solar receiver (not shown) by communication through network 94 to a receiver control system (RCS) 99.

In FIG. 2, the programmable heliostat control systems 65 provided in heliostat field 97 communicate with heliostat array control system 93 through network 94 by means of wireless communications. To this end, each of the programmable heliostat control systems 65 in heliostat field 97 is equipped with a wireless communications transceiver adapter 102, as is wireless network router 101 (access points), which is optionally deployed in network 94 to handle network traffic to and among the programmable heliostat control systems 65 in heliostat field 97 more efficiently. In some embodiments, the portion of network 94 provided in heliostat field 96 can be partially based on copper wire or fiber optic connections. Master control system 95, heliostat array control system 92 and wired network control bus router 100, which is optionally deployed in network 94, can be equipped with a wired communications adapter in order to handle communications traffic to and among the programmable heliostat control systems 65 in heliostat field 96 more efficiently. In some embodiments, master control system 95 is optionally equipped with a wireless communications adapter (not shown).

A solar energy system may include a wireless solar field comprising multiple heliostats. Each heliostat may be controlled by a wireless heliostat controller (WHC). The number of heliostats and the WHCs may range from several hundred to several hundreds of thousands (e.g., on the order of 100 to 400,000 heliostats) and may be distributed in an area with a radius, for example, of approximately 1 km to 5 km.

Each heliostat may be driven by a dual axis drive, which tracks the sun and maintains its focal point on the receiver. Each heliostat may be controlled by the wireless heliostat controller (WHC). The WHC at least controls the two axis motion of the heliostat by driving two stepper motors, one for movement in the azimuth direction and a second for movement in the elevation direction.

Figure 3:
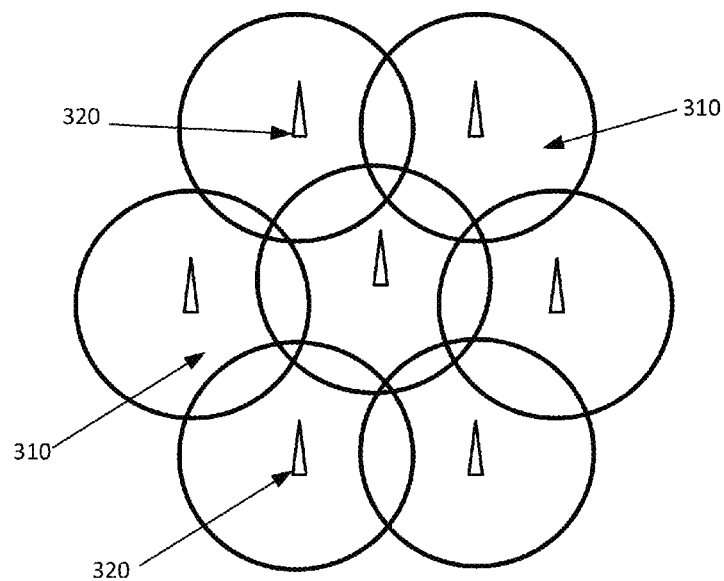
FIG. 3 is an illustration of a cellular concept of a wireless system, according to one or more embodiments of the disclosed subject matter.

As shown in FIG. 3 the system architecture may be based on a "cellular" system concept. A cellular system may comprise multiple cells 310 each of which may comprise an access point 320 and at least one wireless heliostat controller (not shown). A solar field using a cellular system may have zones (e.g., WHCs) which may communicate with multiple access points.

In some embodiments, a cellular system concept may be used to cover a large geographic area. Said geographic area may be split into cells where for each cell two frequencies are assigned for frequency diversity purposes. Since the number of channels that can be used is limited, channel frequencies are reused. The group of cells that have different frequency channels in each cell is called a cluster.

According to some embodiments, the WHC of the heliostat may derive its energy from the sun via a photovoltaic (PV) panel which could be utilized for powering the heliostat. Energy from the PV panel may be stored using any type of storage solution knows to those skilled in the art, such as batteries (e.g., lead acid batteries, NI-CAD and NI-Hydride), capacitors, super capacitors, hydrogen fuel cells, etc. The most practical means to enable wireless communications and/or solar PV charging is to attach antennae and/or a PV array in a position where it will not be blocked or shadowed by other heliostats while simultaneously keeping to a minimum the blocking of sunlight from the antennae and PV array on to its host heliostat and other heliostats. Alternatively, the antenna should not block sunlight from the PV, and the PV should not block the antenna from its line of site (LOS) with the access point.

Figure 4:
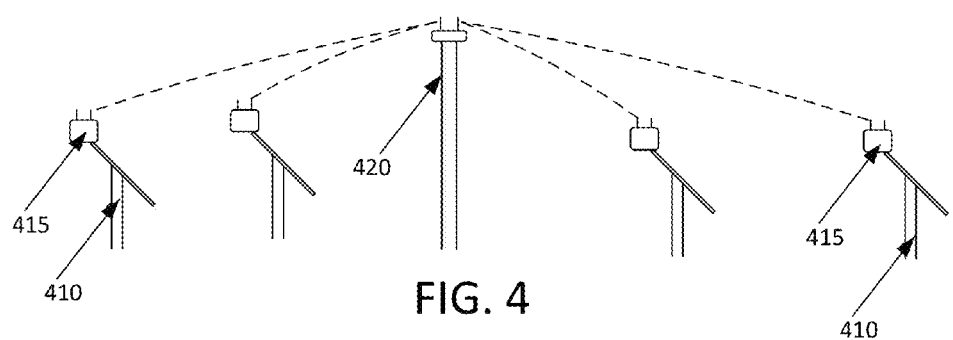
FIG. 4 shows a wirelessly operated solar field, according to one or more embodiments of the disclosed subject matter.

The cellular architectural concept may allow each WHC to minimize its transmit power to the level required to reach its controlling access point (AP) that acts as a "cell controller," thereby reducing the power needed for wireless communication. As shown in FIG. 4, each WHC 415 located on heliostats 410 may be configured to both transmit to and receive data from the access point 420. Further, cellular architecture enables smooth growth of wireless solar field size in terms of the number of WHCs. In some embodiments, cellular architecture enables frequency reuse and allows for the cell to adapt to a differing operating frequency (or frequencies) in accordance with varying wireless conditions in a cell.

WHCs may be subdivided into groups, where each WHC group is controlled by a specific access point. The group of WHCs which are controlled by an AP may be defined as a cell. A wireless solar field may comprise multiple APs (i.e., multiple cells).

Each cell may comprise an AP configured to control and manage data transfer from heliostats located within the cell. The APs may be installed at the center of each cell at a height, for example, of at least 10 m to 15 m in height above the ground. Additionally, the APs may have at least two omni-directional ("omni") antennas or directional antennas for spatial diversity purposes.

Further, each heliostat may contain a WHC, with two omni antennas for spatial diversity purposes, which are capable of transmitting and receiving data from the AP. In some embodiments, communication link performance between heliostats and AP may be improved by placing the antennas on the heliostats at least 10 cm in vertical and horizontal direction above the reflective mirrors. This location on the heliostat may improve the direct line-of-site between the heliostat antennas and the access point. For example, the separation between the two antennas may be at least 15 cm but the separation may depend on the frequency band of operation. In some embodiments, the antennas may move between minus 45 degrees (−45°) to plus 45 degrees (+45°) relative to the vertical position of the antennas when the heliostats are moved from the vertical to the horizontal position.

In some embodiments, simultaneous operation of heliostat groups with their AP is desired, thus the selected frequency band is subdivided into channels that with proper physical distance separation can be reused by "control entities" which are responsible for a group of heliostats. A solar field area may be subdivided into cells, each cell may be controlled by an AP that acts as a "control entity" on behalf of the heliostat array control systems (HACS). Each access points may communicate with the HACS via high speed communication links supplied by wired links that connect each AP to the control room (i.e., HACS).

The AP may act as the "System Controller" for approximately 500, or 1000, or 1500, or 2000, or more heliostats under its control. This number of WHCs that are controlled by their controlling AP may be defined in accordance with several system considerations, such as frequency reuse, radio channel throughput, or limits on HACS to AP to WHC transaction delay.

In some embodiments, the heliostats that are controlled by the AP are distributed across an area with a maximum radius of approximately 200 meters. The radius of the wireless cells, for example, may range from 10 meters to 200 meters. Since the density of the heliostats all over the solar field is not constant, the cells radius size near the receiver, for example, may be approximately 75 meters to 100 meters and will grow as distance from receiver is increased. Near the perimeter of the solar field, the cells size, for example, may range from approximately 10 meters to 100 meters in order to mitigate signal interference and jamming.

A cell radius size of 150 meters may be designed with a fade margin of approximately 30 dB. In a specific example, an output power of 16 dBm from the AP and a receiver sensitivity of −95 dBm will provide a fade margin of approximately 30 dB with cell size of approximately 150 meters.

Figure 5:
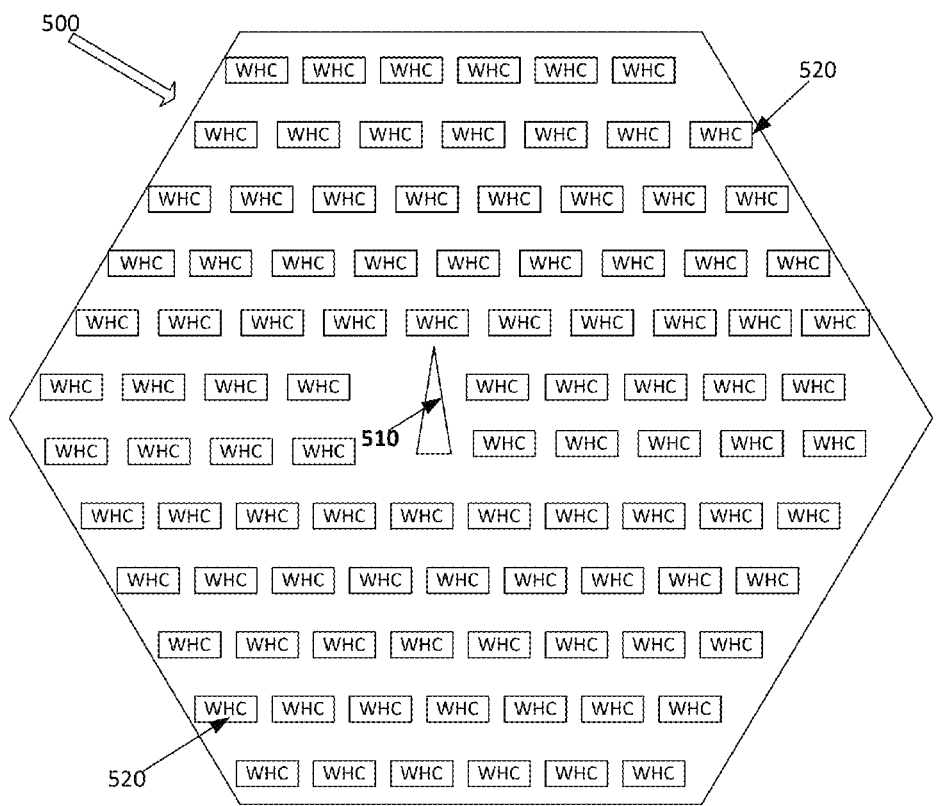
FIG. 5 is an illustration of an access point and wireless heliostat controllers, according to one or more embodiments of the disclosed subject matter.

FIG. 5 illustrates the concept of an AP 510 and WHCs 520 which are under its control. These WHCs 520 are contained within a cell 500 which is controlled by AP 510, where the AP operates on a set of frequencies assigned for that cell.

In some examples, a solar field wireless communication system may use the 2.4 GHz ISM band. Frequencies used may be from approximately 2.401 GHz to approximately 2.482 GHz. In some examples, spacing between the RF channels may be defined as 1 MHz. Alternatively, spacing may be 500 KHz, or 900 KHz, or 1.5 MHz, or 2 MHz or greater.

In some examples, any frequency bands may be utilized in a wireless system. In some examples, the frequency bands used may be in the non-license bands 902-928 MHz, or 2400-2483 MHz or 5150-5825 MHz.

Figure 6:
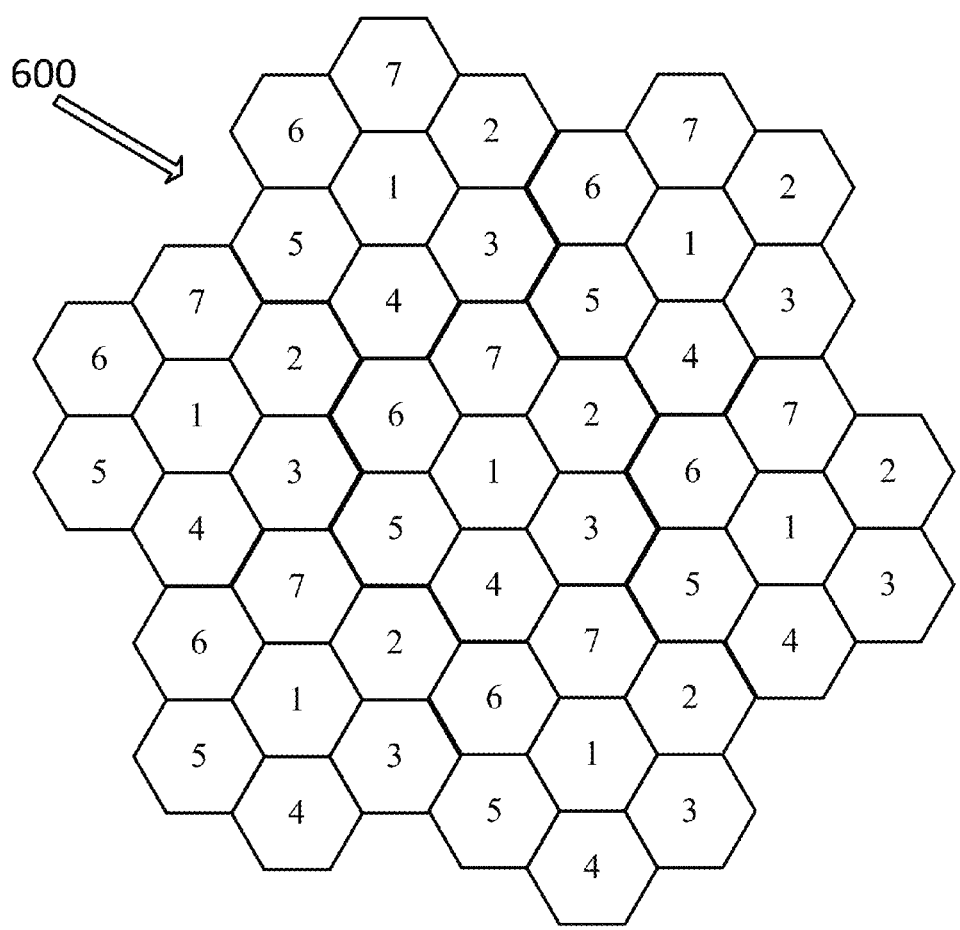
FIG. 6 shows a wirelessly operated solar field with a reuse factor of 7, according to one or more embodiments of the disclosed subject matter.

In order to enhance communication reliability each AP (i.e., cell) may use at least two frequencies for frequency diversity. Two neighboring cells never use the same frequency. In some examples, adjacent cells will not use adjacent frequency channels in order to reduce the probability of adjacent channel blocking and to improve signal to noise performance. In some embodiments, the frequency reuse factor may be 3, 5, 7, 14, 19 or any other reuse factor. The example as shown in FIG. 6 illustrates a design for a wireless system 600 for use in a solar field using a reuse factor of 7. Although the cells are shown in a hexagonal shape, it should be understood that cells are not to be defined by any specific shape. As can be seen in FIG. 6, no two adjacent cells have the same number (i.e., frequency channel). The AP may use these frequencies alternately. In further embodiments, the assignment of frequency channels used by each cell may change from time to time.

For example, the cells can employ frequency diversity groupings as set forth in Table 1 below.

TABLE 1

Frequency Diversity Grouping

| Group Number | Primary Frequency (MHz) | Secondary Frequency (MHz) |
| --- | --- | --- |
| 0 | 2401 | 2441 |
| 1 | 2402 | 2442 |
| 2 | 2403 | 2443 |
| 3 | 2404 | 2444 |
| 4 | 2405 | 2445 |
| 5 | 2406 | 2446 |
| 6 | 2407 | 2447 |
| 7 | 2408 | 2448 |
| 8 | 2409 | 2449 |
| 9 | 2410 | 2450 |
| 10 | 2411 | 2451 |
| 11 | 2412 | 2452 |
| 12 | 2413 | 2453 |
| 13 | 2414 | 2454 |
| 14 | 2415 | 2455 |
| 15 | 2416 | 2456 |
| 16 | 2417 | 2457 |
| 17 | 2418 | 2458 |
| 18 | 2419 | 2459 |
| 19 | 2420 | 2460 |
| 20 | 2421 | 2461 |
| 21 | 2422 | 2462 |
| 22 | 2423 | 2463 |
| 23 | 2424 | 2464 |
| 24 | 2425 | 2465 |
| 25 | 2426 | 2466 |
| 26 | 2427 | 2467 |
| 27 | 2428 | 2468 |
| 28 | 2429 | 2469 |
| 29 | 2430 | 2470 |
| 30 | 2431 | 2471 |
| 31 | 2432 | 2472 |
| 32 | 2433 | 2473 |
| 33 | 2434 | 2474 |
| 34 | 2435 | 2475 |
| 35 | 2436 | 2476 |
| 36 | 2437 | 2479 |
| 37 | 2438 | 2480 |
| 38 | 2439 | 2481 |
| 39 | 2440 | 2482 |

Every wireless system performance is sensitive to external unwanted interference and jamming. Unwanted external interference and jamming can degrade the system signal-to-noise ratio and can affect throughput and performance as well as dramatically degrade the wireless system reliability. External interference and jamming can originate from many sources such as Wi-Fi routers and hotspots, cordless phones, microwaves, two-way radios, pager systems, satellites, other access points that operate at the same frequency band (i.e., co-channel interference), and intentional jammers, etc.

In embodiments, at least a portion of the cells near the solar field borders can have a smaller radius and can be closer to each other than cells in the interior of the field. This will allow the heliostats to receive signals transmitted from APs with much more margin (i.e., less chance of being interfered with) and thereby mitigate potential external wireless interference and jamming.

In order to mitigate external wireless interference, APs may be more densely deployed near the fence (i.e., at the border of the solar field). In an example of a wireless network system transmitting near the fence, only transmission to and from the WHCs located in the range of tens of meters from the fence may be blocked. In some examples, the amount of blocked wireless heliostat controllers is very limited and may not affect the overall performance of the solar field.

In some embodiments, a solar field may be operated via a wireless data system comprising a plurality of APs and a plurality of heliostats. Each of the heliostats may be associated at a given time with a respective one or more of the APs, and each heliostat may exchange wireless data communication messages with the respective one or more of the APs. The method of operating may include locating heliostats and APs in a solar field such that a first portion of the solar field within a first radial distance from a solar receiver is characterized by having a lower ratio of heliostats to APs than a second portion of the solar field which may be distributed beyond the first radial distance. The second portion of the solar field may be more vulnerable to an interference signal, which may, for example, originate from outside the solar field. In a further embodiment, the cell size of each AP may be smaller in the second portion of the solar field than in the first portion of the solar field. Further, the AP deployment in the second portion may be optimized responsively to one or more predetermined interference signals.

In order to mitigate the external interference it may be desirable to operate the APs in the second portion of the solar field at a higher power level, on average, than those in the first portion. In some embodiments, some of the heliostats located in the second portion may communicate with the control system via a wired communication system (e.g., via electrical wiring) as opposed to communicating wirelessly.

In some embodiments, the heliostats in the first portion act as repeaters for heliostats in the second portion. In order to improve the performance of heliostats, they may be served by an intermediary entity, e.g., a repeater. A repeater may be defined as a wireless heliostat controller (WHC) that is assigned by an access point (AP) to act as a repeating entity for transmitting and receiving messages that are directed towards other specific WHCs that are "served" by that repeater. The repeater may collect messages delivered by the AP, for WHCs that are assigned to it, by the AP, as its "slaves." Following the reception of those messages for its "slaves," the repeater re-transmits those messages to the WHC "slaves." The repeater may then collect the responses from the WHC "slaves", and then send the received responses from its WHC "slaves" to the AP. In a further embodiment, a first plurality of heliostats in the second portion of the solar field may act as repeaters for a second plurality of heliostats in the second portion of the solar field. The determination of which WHCs are to be used as repeaters may be based on geographic considerations. A WHC at a higher elevation may be used as a repeater for a WHC at a lower elevation, which cannot be "seen" by the AP.

In some embodiments, the WHC may not be designated to a specific AP. If communication between the WHC and its initially designated AP is non-existent for a predefined amount of time then a handover procedure may be initiated. The term handover refers to the process of transferring the WHC to another AP that controls a different cell, such that the WHC communicates with and is controlled by this "new" AP.

In some embodiments, when there is good communication between the WHC and its initially designated AP, the WHC may monitor the frequencies used in adjacent or nearby cells and record the signal level of these frequencies. This may be accomplished by reading and recording the received signal strength indicator (RSSI), which is a measurement of the power present in a received radio signal. The recorded RSII information may then be relayed from the WHC to the AP, which may further relay the RSII data to a control room.

If for a predefined amount of time no communication between the AP and WHC is established, the WHC will "move" to the neighbor cell channel with the best signal level. The WHC may then communicate with another AP operating at a different frequency and in different cell. As the RSII was already recorded and therefore known, the AP associated with the cell with the maximum RSII level may then communicate with the WHC.

In embodiments, a solar tower system may comprise a solar tower having a target therein, a field of heliostats surrounding the solar tower. Each heliostat may be configured to direct insolation at the target in the solar tower and to receive communications over at least one wireless network. The field may include an inner region and an outer region, both the inner and outer regions being centered on the solar tower, and the outer region surrounding the inner region. The system may further comprise a plurality of APs configured to communicate over the wireless network to permit each of heliostats to receive communications therefrom. The AP density in the outer region of the solar field may be higher than the AP density in the inner region. Further, the outer region is more susceptible to wireless communication interference than the inner region. In some examples, the APs in the outer region may be positioned responsively to a measured and/or predicted interference signal. Alternatively, the AP deployment in the outer region may be optimized responsively to one or more predetermined interference signals. In some embodiments, an AP detecting external interference may send a signal to the control room indicating that the channel has been compromised. A different channel of operation that does not interact with the interference frequency may be assigned to this AP.

Certain embodiments include a method of mitigating interference originating from outside the solar field between an AP and a heliostat in a wireless communication system located in a solar field. The solar field may include a receiver and a solar tower, heliostats surrounding the solar tower, as well as a plurality of APs. Each heliostat may be configured to wirelessly communicate with at least one AP. The method may include deploying a first plurality of APs in a first section of the solar field such that each of the APs is a first distance from its neighbor; and deploying a second plurality of APs in a second section of the solar field, adjacent to an outer border of the solar field such that each of the APs is a second distance from its neighbor. In some examples the first distance is greater than the second distance. In some examples, the first distance between neighboring APs is between approximately 100 meters and approximately 200 meters. The second distance between neighboring APs is between approximately 10 meters and approximately 100 meters.

The solar field may be arranged such that the second section of the solar field surrounds the first section of the solar field, and that the distance between the outer border of the solar field and the first section may range from approximately 100 meters to 1000 meters.

In some embodiments, the access points in the first section of the solar field have a coverage area radius of between approximately 100 meters and approximately 200 meters and the access points in the second section of the solar field have a coverage area radius of between approximately 10 meter and approximately 100 meters.

Further measures may be introduced in order to further mitigate wireless interference originating from outside the solar field. These may include but are not limited to, increasing the signal power of the APs in the second section of the solar field, and/or space-time block coding in the second section of the solar field, and/or providing a space diversity between the antenna on each of the heliostats in the second section of the solar field and/or utilizing a portion of heliostats in the first section as repeaters for heliostats in the second section and/or wiring (i.e. not wireless) at least some of the heliostats in the second section.

Certain embodiments may include a method of controlling a field of heliostats. Heliostat control commands may be transmitted from a controller, through the APs, to the wireless stations, such that at least some of the control commands are specific to respective individual heliostats. The heliostats may then be controlled responsively to the commands conveyed from the controller, through the APs, to the wireless stations.

The solar field may include an inner region, which may include points of the solar field near the central solar receiver, confined within an inner region located between 10 percent (10%) and 90 percent (90%) of a maximum dimension of the field, and an outer region, which may include the points remote from the central solar receiver, substantially surrounding the proximal inner region. The average density of the access points in the outer region may be at least 30% greater than the average density of the access points in the inner region.

According to some embodiments, the APs and wireless stations may be configured to communicate according to different communication protocols in the inner and outer regions, respectively. In one specific example, the communication protocol to be used in the outer region may have a higher noise mitigation characteristic than communication protocol to be used in the inner region. For example, the communication protocol to be used in the outer region employs space-time block coding and lower data rate to improve the signal-to-noise ratio in this area.

In some embodiments, a solar field may be operated via a wireless data system comprising a plurality of APs and a plurality of heliostats. Each of the heliostats may be associated at a given time with a respective one or more of the APs, and each heliostat may exchange wireless data communication messages with the respective one or more of the APs. The method of operating may include defining a first portion and a second portion of the solar field in which the APs and heliostats are arrayed about a solar receiver. The first portion may have a radius extending from the solar receiver to a first distance from the receiver and the second portion may have a first border adjoining the first portion and a second border delineating the solar field boundary. The ratio of heliostats to APs is greater in the second portion than in the first portion.

Figure 7A:
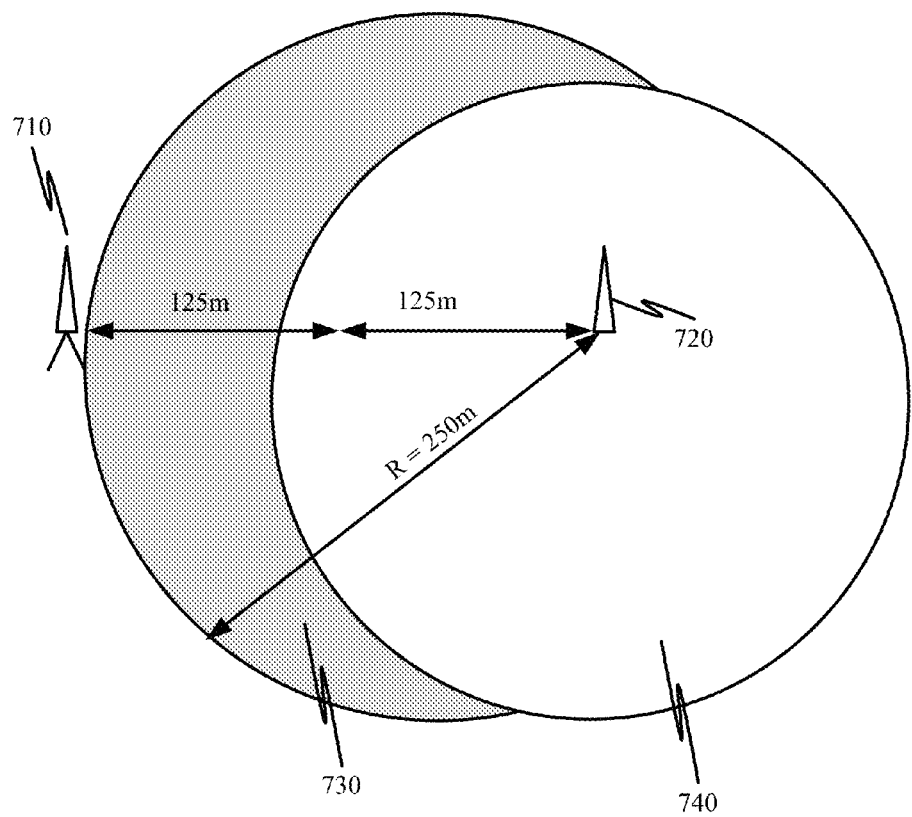
FIGS. 7A-7D show a wirelessly operated solar field with an external interference signal, according to one or more embodiments of the disclosed subject matter.

In one example, as shown in FIG. 7A, an interferer 710 may generate an interference signal at the solar field border with a power output of 20 dBm. In other words, using 1 MHz of bandwidth the equivalent power of the interfering signal is 8 dBm. In order for the AP 720 to successfully acquire message detection the signal to interference ratio may be greater than 10 dB. In such an example, the ratio between the distance of interferer 710 from each of the heliostats to the distance to AP 720 may be such that with a cell size of approximately 250 meters, the blocked area 730 is greater than the non-blocked area 740 (i.e., the area which AP 720 may wirelessly communicate with the heliostats associated with its cell). As shown in FIG. 7A, in the direction of the solar field border, an AP with a cell radius of 250 meters would be able to wirelessly communicate with heliostats located approximately 125 meters away and the remaining approximately 125 meters may be blocked by the interference signal.

Figure 7B:
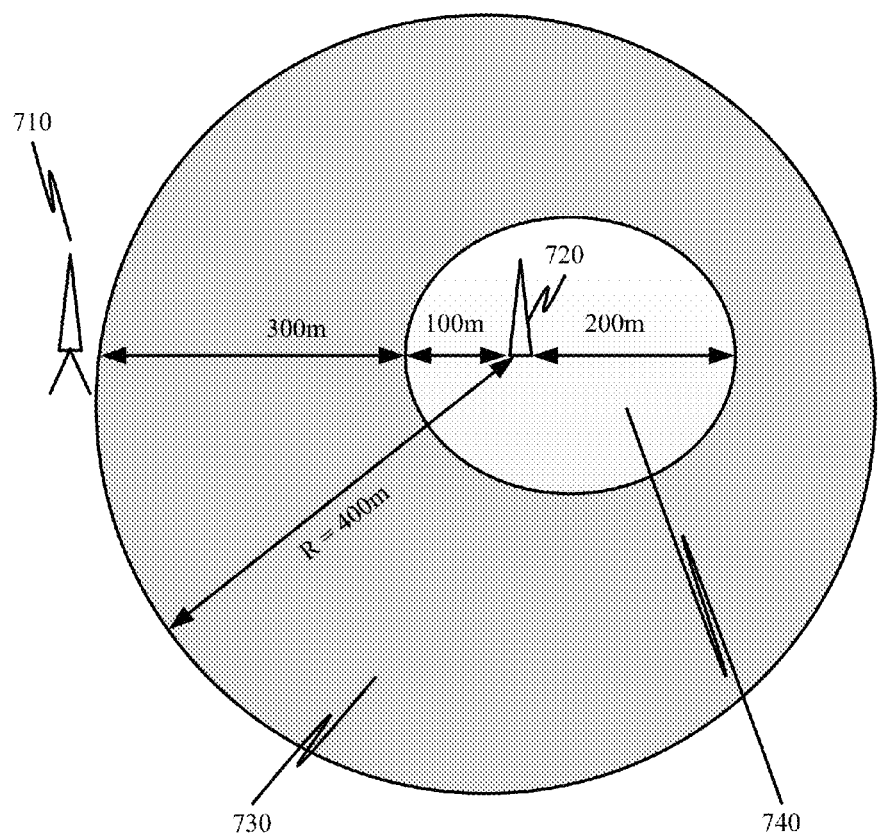

In a further example, as shown in FIG. 7B, an interferer 710 may generate an interference signal at the solar field border with a power output of 20 dBm. In other words, using 1 MHz of bandwidth the equivalent power of the interfering signal is 8 dBm. In order for the AP 720 communicating with heliostats with the 900 MHz band to successfully acquire message detection the signal to interference ratio may be greater than 10 dB. In such an example, the ratio between the distance of interferer 710 from each of the heliostats to the distance to AP 720 may be such that with a cell size of approximately 400 meters, the blocked area 730 is three times greater than the non-blocked area 740 (i.e., the area which AP 720 may wirelessly communicate with the heliostats associated with its cell). As shown in FIG. 7B, in the direction of the solar field border, an AP with a cell radius of 400 meters would be able to wirelessly communicate with heliostats located approximately 100 meters away and the remaining approximately 300 meters may be blocked by the interference signal.

Figure 7C:
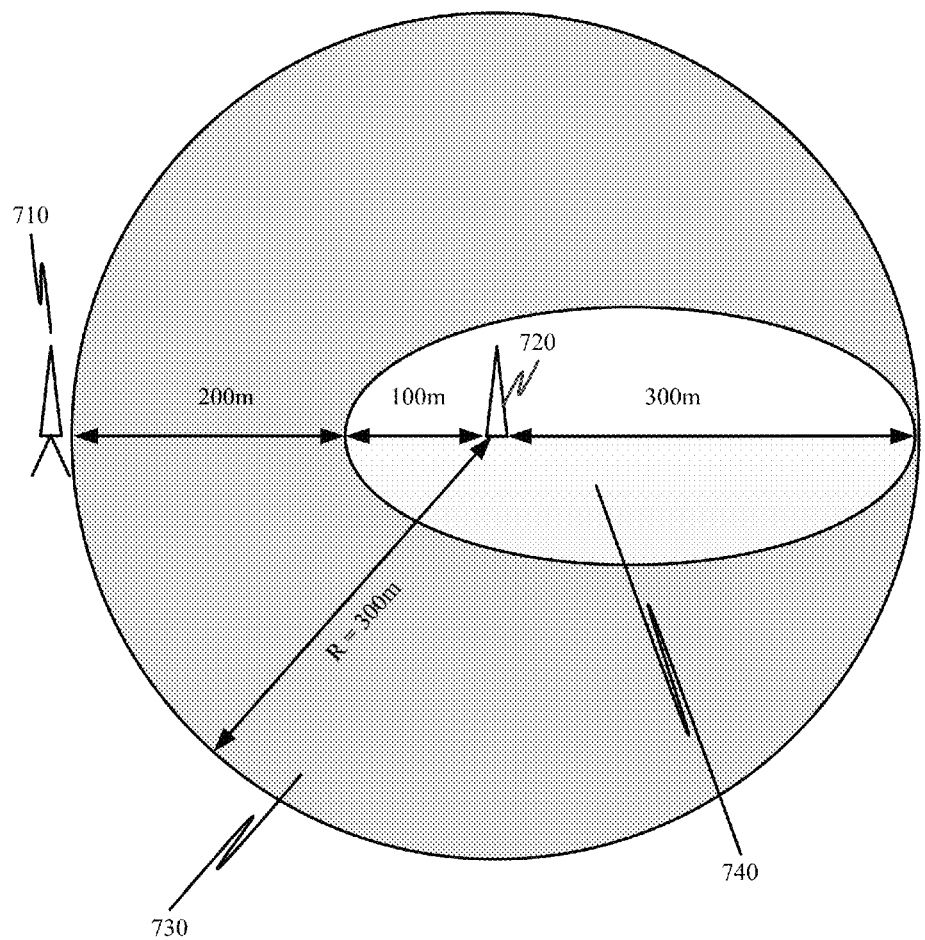

In a further example, as shown in FIG. 7C, AP 720 may communicate with heliostats within the 5 GHz band. So as to successfully acquire message detection the signal to interference ratio may be greater than 6 dB. In such an example, the ratio between the distance of interferer 710 from each of the heliostats to the distance to AP 720 may be such that with a cell size of approximately 300 meters, the blocked area 730 is two times greater than the non-blocked area 740 (i.e., the area which AP 720 may wirelessly communicate with the heliostats associated with its cell). As shown in FIG. 7C, in the direction of the solar field border, an AP with a cell radius of 300 meters would be able to wirelessly communicate with heliostats located approximately 100 meters away and the remaining approximately 200 meters may be blocked by the interference signal.

Figure 8:
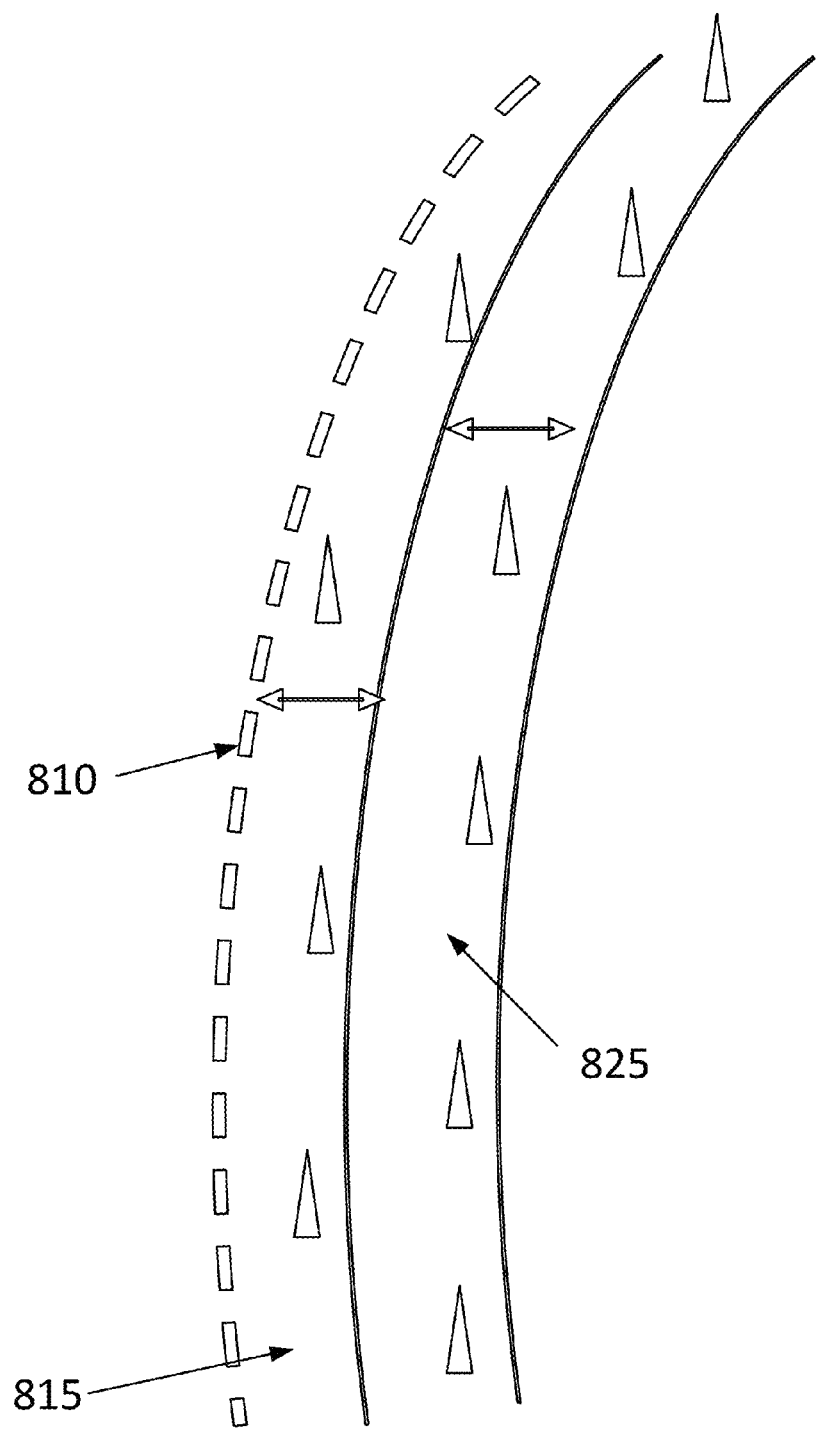
FIG. 8 shows a wirelessly operated solar field with an external interference signal, according to one or more embodiments of the disclosed subject matter.

As illustrated in FIG. 8, in order to reduce the amount of heliostats which may be affected by an interference signal originating close to the solar field border, a set of APs may be deployed in a first region 815 which may be, for example, at a distance of approximately 150 meters to 200 meters from the solar field border 810. In this example, with a reduced cell size radius of approximately 150 meters to 200 meters, a second set of APs may be deployed in a second region 825 which may be for example distance of approximately 300 meters to 400 meters from solar field border 810.

Figure 7D:
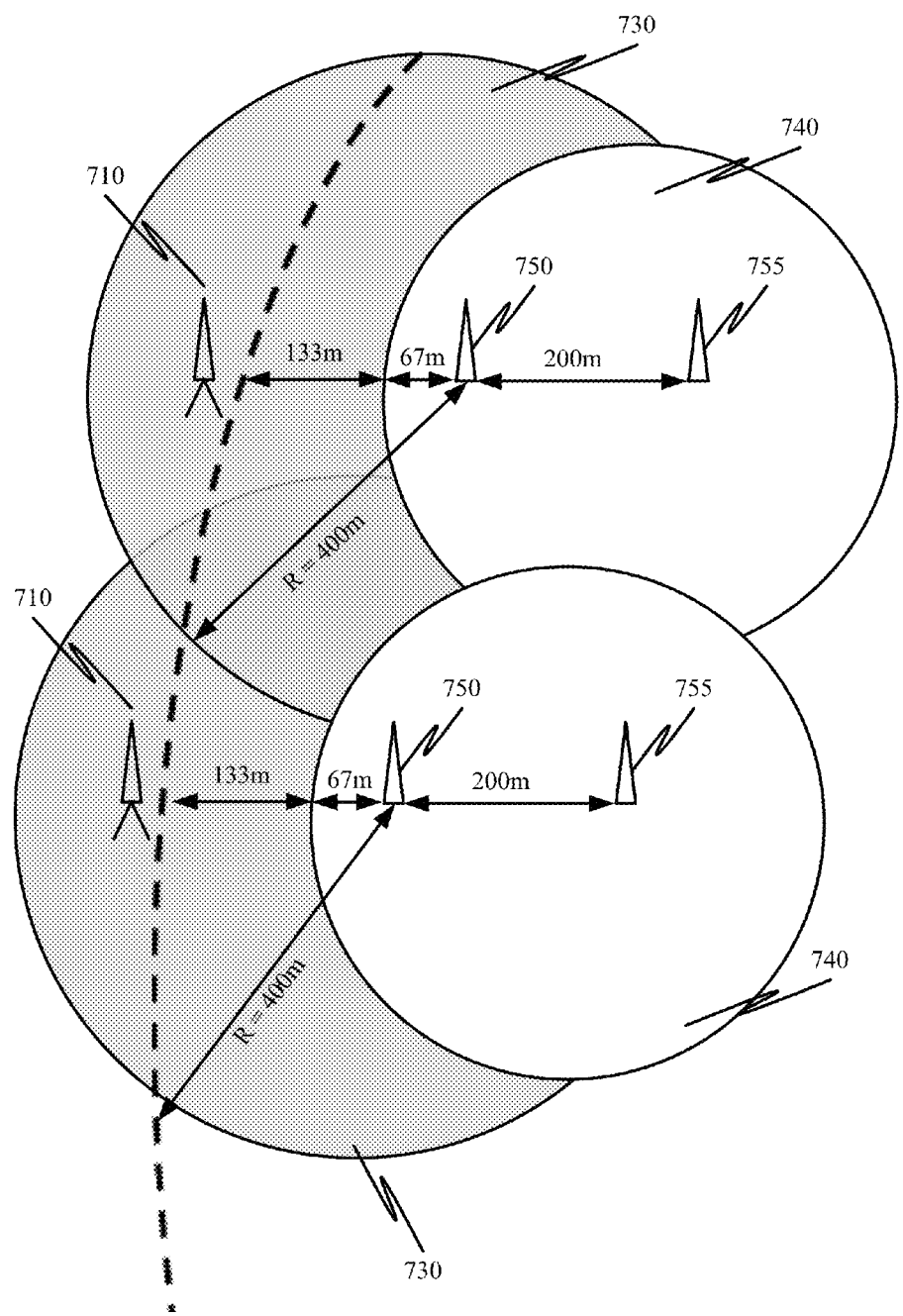

Referring to FIG. 7D, by placing a first set of APs 750 at a distance of 200 meters from the solar field border and by placing a second set of APs 755 at a distance of 200 meters from the first set of APs (i.e., 400 meters from the border), the number of heliostats which may be affected will be reduced to those found within 133 meters from the solar field border. In a further embodiment (not shown), by shrinking the cell radius size from 200 meters to 150 meters, the overall number of affected maybe reduced further such that with a cell radius of 150 meters only those heliostats approximately 100 meters from the border may be affected by external interference.

In some embodiments, the control system can include digital storage media chosen from any of the media types known in that art for storing data (e.g., magnetic, solid-state, optical). The control system can also store data on a regular or continuous basis. The control system can be configured to store light intensity values at any desired time resolution, and optionally, to store graphic representations. As an alternative to storing graphic representations, the control system can be configured to generate graphic representations on demand from data retrieved from the storage media. The control system may thus include appropriate software instructions, stored internally therein or on a computer readable medium used by the control system, for causing the control system to carry out the above-noted functions.

The method may also include creating a storage archive of data and using that data for revising solar field control instructions, techniques or performance models or model parameters.

It is further noted that any of the embodiments described above may further include receiving, sending or storing instructions and/or data that implement the operations described above in conjunction with the figures upon a computer readable medium. Generally speaking, a computer readable medium may include storage media or memory media such as magnetic or flash or optical media, e.g., disk or CD-ROM, volatile or non-volatile media such as RAM, ROM, etc., as well as transmission media or signals such as electrical, electromagnetic or digital signals conveyed via a communication medium such as network and/or wireless links.

It will be appreciated that the methods, processes, and systems described above can be implemented in hardware, hardware programmed by software, software instruction stored on a non-transitory computer readable medium or a combination of the above. For example, the processors described herein can be configured to execute a sequence of programmed instructions stored on a non-transitory computer readable medium. The processors can include, but are not limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C++, C#.net or the like. The instructions can also comprise code and data objects provided in accordance with, for example, the Visual Basic™ language, or another structured or object-oriented programming language. The sequence of programmed instructions and data associated therewith can be stored in a non-transitory computer-readable medium such as a computer memory or storage device which can be any suitable memory apparatus, such as, but not limited to read-only memory (ROM), programmable read-only memory (PROM), electrically erasable programmable read-only memory (EEPROM), random-access memory (RAM), flash memory, disk drive, etc.

Furthermore, the disclosed methods, processes, and/or systems can be implemented by a single processor or by a distributed processor. Further, it should be appreciated that the steps discussed herein can be performed on a single or distributed processor (single and/or multi-core). Also, the methods, processes, and/or systems described herein can be distributed across multiple computers or systems or can be co-located in a single processor or system. Exemplary structural embodiment alternatives suitable for implementing the methods, processes, and/or systems described herein are provided below, but not limited thereto.

The methods, processes, and/or systems described herein can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and a software module or object stored on a computer-readable medium or signal, for example. Moreover, embodiments of the disclosed methods, processes, and/or systems (e.g., computer program product) can be implemented in software executed on a programmed general purpose computer, a special purpose computer, a microprocessor, or the like.

Embodiments of the disclosed methods, processes, and/or systems (or their sub-components or modules) can be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a programmable logic device (PLD), programmable logic array (PLA), field-programmable gate array (FPGA), programmable array logic (PAL) device, etc. In general, any process capable of implementing the functions or steps described herein can be used to implement embodiments of the methods, processes, systems and/or computer program product (software program stored on a non-transitory computer readable medium).

Furthermore, embodiments of the disclosed methods, processes, and/or systems can be readily implemented, fully or partially, in software using, for example, object or object-oriented software development environments that provide portable source code that can be used on a variety of computer platforms. Alternatively, embodiments of the disclosed methods, processes, and/or systems can be implemented partially or fully in hardware using, for example, standard logic circuits or a very-large-scale integration (VLSI) design. Other hardware or software can be used to implement embodiments depending on the speed and/or efficiency requirements of the systems, the particular function, and/or particular software or hardware system, microprocessor, or microcomputer being utilized. Embodiments of the disclosed methods, processes, and/or systems can be implemented in hardware and/or software using any known or later developed systems or structures, devices and/or software by those of ordinary skill in the applicable art from the function description provided herein and with knowledge of solar thermal systems and/or computer programming arts.

Features of the disclosed embodiments may be combined, rearranged, omitted, etc., within the scope of the present disclosure to produce additional embodiments. Furthermore, certain features may sometimes be used to advantage without a corresponding use of other features.

It is thus apparent that there is provided, in accordance with the present disclosure, systems and methods for wireless communications in a solar field. Many alternatives, modifications, and variations are enabled by the present disclosure. While specific embodiments have been shown and described in detail to illustrate the application of the principles of the invention, it will be understood that the invention may be embodied otherwise without departing from such principles. Accordingly, Applicant intends to embrace all such alternatives, modifications, equivalents, and variations that are within the spirit and scope of the present invention.

The invention claimed is:

1. A method of operating a wireless data system in a solar field with a central receiver, the system comprising a plurality of access points and a plurality of heliostats, where the heliostats are wireless clients with respective transceivers, the method comprising:
   receiving at one or both of each access point and each heliostat, respective communication codes that permit communication between an access point and only a respective group of heliostats, each of the respective group of heliostats falling within a range of distances respective to each of the access points;
   the solar field having a perimeter such that first ones of the access points are closer to the perimeter than second ones of the access points;
   the receiving being such that a maximum distance of the respective range of distances of said second ones of the access points are greater in magnitude than a maximum distance of the respective range of distances of said first ones of the access points, enabling access points that are more remote from the perimeter to communicate with heliostats that are farther from them than access points closer to the perimeter.

2. The method of claim 1, wherein the heliostats permitted to communicate with the first ones of the access points are vulnerable to an interference signal originating from outside the solar field.

3. The method of claim 1, wherein the cell sizes of the first ones of access points are smaller than the second ones of access points.

4. The method of claim 1, further comprising operating the first ones of access points at a higher power level, on average, than the second ones of access points.

5. The method of claim 1, wherein at least some of the heliostats located near the perimeter exchange data communication via a wired communication system.

6. The method of claim 1, wherein a first heliostat acts as a repeater for a second heliostat.

7. The method of claim 6, wherein the first heliostat is remote from the perimeter and the second heliostat is located near the perimeter.

8. The method of claim 1, wherein a first plurality of heliostats located near the perimeter act as repeaters for a second plurality of heliostats located near the perimeter.

9. The method of claim 1, further comprising generating a command signal when an interference signal is detected.

10. The method of claim 1, wherein the first ones and second ones of access points are configured to communicate according to first and second communication protocols with their respective assigned heliostats, respectively, wherein the second communication protocol has a higher signal noise mitigation characteristic, according to a predetermined type of interference, than the first protocol.

11. The method of claim 10, wherein the second protocol employs space-time block coding.

12. A system for wireless data communication in a solar power plant, the solar power plant comprising a solar field having a perimeter, the system comprising:
   a plurality of wireless heliostat controllers configured for wireless data communication with at least one access point;
   a first plurality of access points in a first section of the solar field not adjacent to the perimeter, each of the first plurality of access points being a first distance from its neighbor; and
   a second plurality of access points in a second section of the solar field adjacent to the perimeter, each of the second plurality of access points being a second distance from its neighbor;
   wherein the first distance is greater than the second distance.

13. The system of claim 12, wherein the density of access points per unit of land area is higher in an outer region than in an inner region.

14. The system of claim 13, wherein the density in the outer region is at least 10% or 20% or 30% higher than in the inner region.

15. The system of claim 12, wherein the second section of the solar field surrounds the first section of the solar field, and the minimum distance between the perimeter and the first section is at least 100 meters.

16. The system of claim 15, wherein the minimum distance between the perimeter of the solar field and the first section is at most 1 kilometer.

17. The system of claim 12, wherein the first distance between neighboring access points is between 100 meters and 200 meters, inclusive.

18. The system of claim 12, wherein the second distance between neighboring access points is between 10 meters and 100 meters, inclusive.

19. The system of claim 12, wherein a first portion of the solar field in which the access points and heliostats distributed within a first radial distance from a solar receiver are characterized by a lower ratio of heliostats to access points than a second portion distributed beyond the first radial distance.

20. The system of claim 12, further comprising a plurality of antennas connected to each wireless heliostat controller, wherein there is space diversity between the antennas on each of the heliostats in the second section of the solar field.

21. The system of claim 12, wherein the access points in the outer region are positioned responsively to measured and/or predicted wireless communication interference.

22. The system of claim 12, wherein the access point deployment in the second section is optimized responsively to one or more predetermined interference signals.

23. The system of claim 12, wherein at least some of the heliostats located in the second section are configured to exchange data communication via a wired communication system.

24. A method of operating the system of claim 12, comprising at least one of increasing the signal power of the access points in the second section of the solar field and space-time block coding in the second section of the solar field.

25. A method of operating a wireless data system in a solar field with a central receiver, the system comprising a plurality of access points and a plurality of heliostats, the method comprising;
   at each of the access points, receiving communication signals from a proximate subset of the plurality of heliostats within a respective physical distance of the each of the access points, the respective physical distance being within a pre-determined range for each of the access points;
   at each of the access points, decoding signals received from heliostats in the subset of the plurality of heliostats which are assigned to the respective access points, the assignments of heliostats to access points being at least one of stored permanently in a database, stored temporarily in a database, received in an instruction communicated through a wireless data system, represented by a transmitted communications code, and encoded in a transmission; and detecting but not decoding signals from other heliostats in the subset so as to filter out unassigned heliostats.

26. The method of claim 25, wherein the solar field has a perimeter such that heliostats assigned to access points closer to the perimeter are restricted to a smaller respective physical distance from respective access points than are heliostats assigned to access points farther from the perimeter.

27. The method of claim 26, wherein the heliostats assigned to the access points closer to the perimeter are vulnerable to electromagnetic interference originating from outside the solar field.

* * * * *